Oct. 16, 1962          E. M. MARTENSSON          3,058,340
METHOD AND MEANS FOR INDICATING FUEL MILEAGE
Filed March 31, 1960
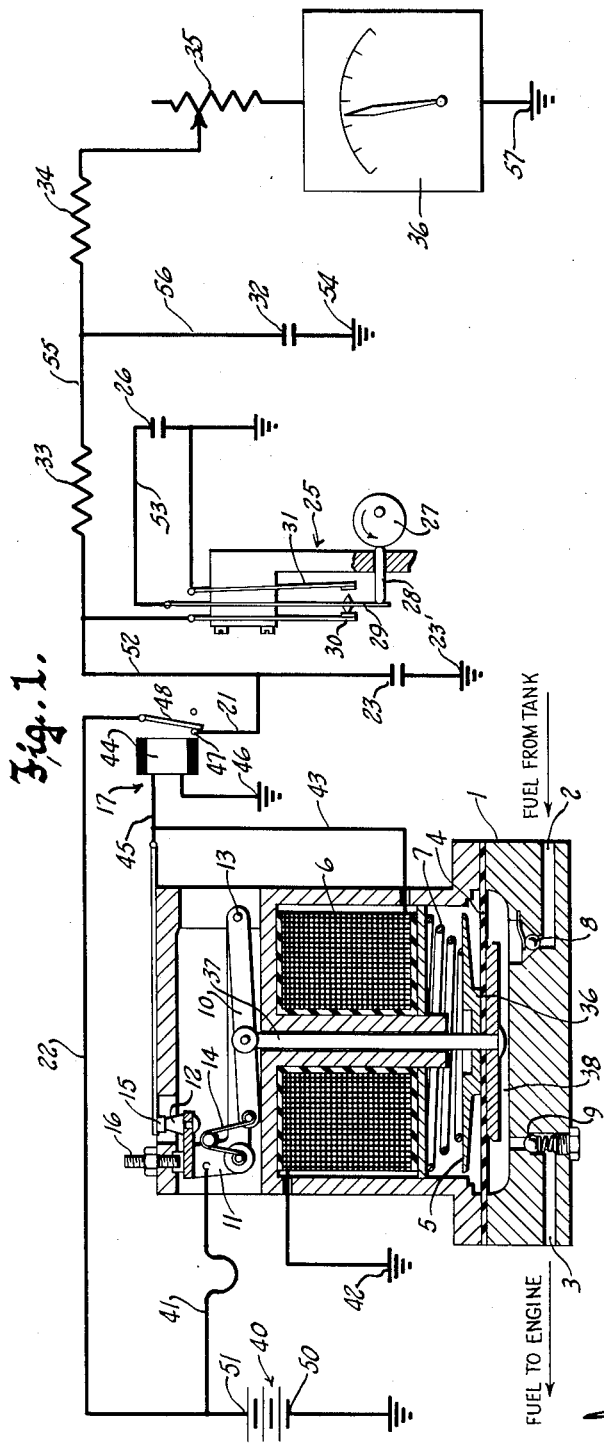
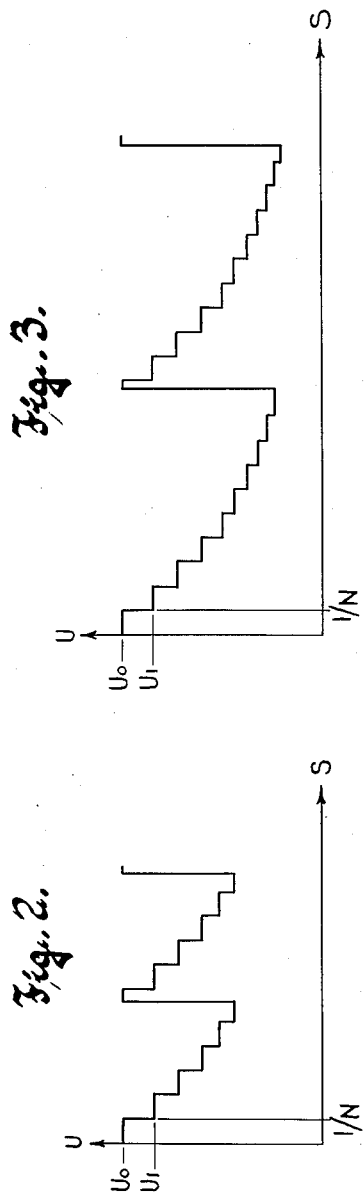
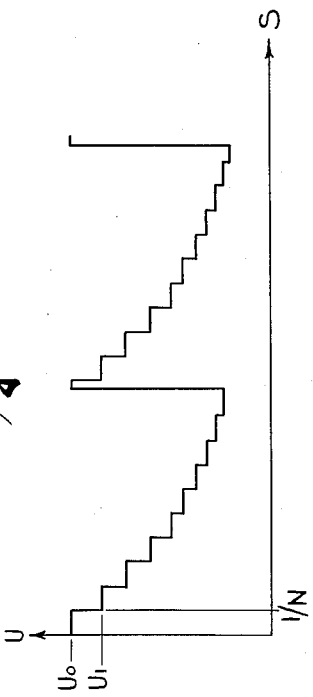
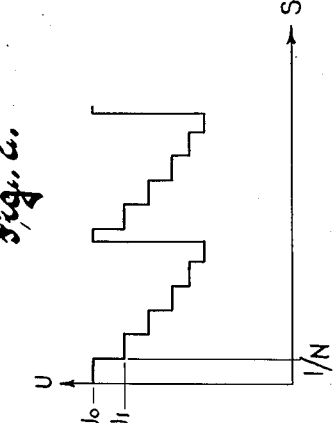
Inventor
Erik Marten Martensson
By
Attorney

United States Patent Office 3,058,340
Patented Oct. 16, 1962

3,058,340
METHOD AND MEANS FOR INDICATING FUEL MILEAGE
Erik Marten Martensson, Molndal, Sweden, assignor to Svenska Aeroplan Aktiebolaget, Linkoping, Sweden, a corporation of Sweden
Filed Mar. 31, 1960, Ser. No. 18,976
7 Claims. (Cl. 73—114)

This invention relates to a method and apparatus for indicating fuel mileage, that is, the relationship between fuel consumption of a vehicle and distance traversed, and more specifically this invention relates to a method and apparatus for instantaneously and continuously presenting an indication of fuel mileage. The relationship that is determined and indicated by the method and apparatus of this invention may be presented in terms of gallons per mile, or of miles per gallon, or in any other desired fuel quantity and distance units, but for simplicity this relationship, is herein referred to by the popular term "fuel mileage," and the apparatus for indicating this relationship is sometimes herein termed a "fuel mileage meter."

Heretofore such devices as have been available for providing an indication of the fuel economy of a vehicle have usually been of the fuel flow meter type, which merely measured and indicated the rate at which fuel was consumed per unit of time, making it necessary for the driver to convert this information, by calculation, into terms of fuel mileage. For drivers of surface vehicles, however, information concerning the rate of fuel consumption per unit of time is of less value than information concerning actual fuel mileage being obtained, since the selection of the proper transmission gear ratio for the road gradient and conditions being encountered, and the effects upon fuel economy of engine temperatures and other variable factors, can only be determined and acted upon when the driver has a continuing, direct and immediate indication of fuel mileage, and when he is not required to make calculations in order to be able to operate the vehicle in accordance with the available information.

One type of instrument that has heretofore been proposed to meet the requirement for a device that affords a direct reading of fuel mileage has comprised a fuel rate-of-flow meter by which an indication of fuel consumption per unit of time was presented on a scale that was graduated in terms of distance units per unit of fuel quantity, e.g., miles per gallon. Such an instrument gave an accurate indication of fuel mileage only when the vehicle was traveling at a predetermined speed and in high gear. To obtain the actual fuel mileage at other gear ratios and speeds it was necessary to apply correction factors to the values read from the indicator scale.

It has also been proposed to measure the vacuum (manifold pressure) in the engine induction system and present an indication of this measured value in terms of fuel mileage, but such a presentation is likewise very unreliable because fuel mileage is only related in part to manifold pressure and is also dependent upon other factors.

Another type of device that has heretofore been suggested for measuring and indicating the relationship between fuel consumption and distance has employed mechanical or electrical means to produce an output corresponding to fuel quantity consumed per unit of time, other means to produce an output corresponding to the velocity of the vehicle, and means for feeding these two outputs into an instrument that calculated the quotient of the values to which the two outputs corresponded. Such devices were complicated and expensive because each output included a value corresponding to time, as a divisor of the quantity represented, and in practice such devices have not come into general use.

By contrast, the present invention has for its object the provision of a device for continuously indicating the immediate relationship between fuel consumption of a vehicle and distance traversed by the vehicle, which device employs very simple electrical instrumentalities including a galvanometer which is calibrated in terms of miles per gallon or similar units of distance vs. units of fuel, and on which the relationship between fuel consumption and distance traversed may be read continuously, directly and immediately, so that the vehicle can at all times be readily operated in such a manner as to insure optimum fuel economy.

Another object of this invention resides in the provision of a method and means for providing a continuous direct presentation of the immediate relationship between fuel consumption and distance traversed by a vehicle, which method and means provides accurate fuel mileage readings at all speeds of the engine and vehicle, regardless of the gear in which the vehicle is traveling, without the necessity for applying any correction factor to the information presented by the instrument or of making any calculation therefrom.

Another object of this invention resides in the provision of a fuel mileage meter or the like which employs very simple conventional and inexpensive components, namely, switch means, capacitors, resistors, and a galvanometer or the like, connected in a very simple electrical circuit, so that the instrument of this invention is inexpensive, accurate and dependable.

It is also an object of this invention to provide a fuel mileage meter adapted to cooperate with a fuel pump of the positive displacement type which recurrently transfers uniform quantities of fuel from a fuel source to a point of fuel consumption such as the engine of a vehicle, and wherein a capacitor is electrically charged each time one of such quantities of fuel is delivered to the point of consumption and is partially discharged each time the vehicle traverses a small predetermined unit of distance, and wherein the average remaining charge across the capacitor is continuously indicated in terms of the immediate relationship between fuel consumption and distance traversed.

With the above and other objects in view which will appear as the description proceeds, this invention resides in a novel method and means substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a vertical sectional view through a fuel pump which comprises an element of the apparatus of this invention, shown in its operative relationship to the remaining elements of the apparatus, which are depicted more or less diagrammatically;

FIGURE 2 is a graph showing the operation of the device under conditions of relatively high fuel consumption per unit of distance traveled; and FIGURE 3 is a graph similar to FIGURE 2, but showing the operation of the device under conditions of more economical fuel consumption.

Referring now more particularly to the accompanying drawings, the numeral 1 designates generally the hollow body of an electrically driven positive displacement fuel pump, in which is housed a solenoid 6, a diaphragm 4 which spans the lower portion of the body cavity, beneath the solenoid, and a plunger 5 having a head 36, disposed beneath the solenoid and drivingly connected with the diaphragm, and a coaxial upwardly projecting stem 37 embraced by the solenoid. The diaphragm cooperates with wall portions of the body to define a variable volume pump chamber 38 having an inlet 2 adapted to be connected with the fuel tank (not shown) of a vehicle in which the device is installed and an outlet 3 adapted to be connected with a point of fuel consumption, namely the engine (not shown) of the vehicle. A coiled compression spring 7, surrounding the upright stem 37 of the plunger 5 and confined between the bottom of the solenoid and the head 36 of the plunger, yieldingly resists upward displacement of the plunger and diaphragm in response to the magnetic attraction of the solenoid when the latter is energized and propels the plunger and the diaphragm downwardly when the solenoid is deenergized.

Upon energization of the solenoid, the upward displacement of the diaphragm causes fuel to be drawn into the chamber 38 through the inlet 2, past a check valve 8; and when the solenoid is deenergized the downwardly displacement of the diaphragm effected by the spring 7 causes fuel to be expelled from the chamber, through the outlet 3, past a check valve 9.

Energization and deenergization of the solenoid are controlled by means of an overcenter snap switch connected with the stem 37 of the solenoid plunger to be actuated thereby and comprising a pair of arms 10 and 11 which extend across the top of the solenoid, transversely to the plunger stem, and which are pivoted on a shaft 13 for independent up and down swinging motion. The arm 10, which comprises the actuating member of the overcenter snap switch, is connected with the upper end of the plunger stem 37 to be swung in unison with up and down axial motion of the plunger, and the arm 11, which comprises the actuated member of the overcenter switch, has a lost motion connection with the actuating member provided by an overcenter spring 14 connected between the free ends of the arms. The actuated member 11 carries on its outer end portion a movable contact 12 that cooperates with a fixed contact 15 on the pump body to make and break a solenoid energizing circuit that comprises a battery 40 or other source of direct current having a grounded terminal 50 and an ungrounded terminal 51, a conductor 41 connecting the ungrounded terminal of the battery with the actuated arm 11 and the movable contact 12 carried thereby, and a conductor 43 that connects the fixed contact 15 with one side of the solenoid winding. The other side of the solenoid is grounded as at 42.

It will be apparent that when the plunger 5 is in its lowermost position, corresponding to the minimum volume of the pump chamber, the actuating arm 10 will likewise be in its lowermost position of swinging motion, and because of the action of the overcenter spring 14 the actuated arm 11 will be in its uppermost position, engaging the movable contact 12 against the fixed contact 15 to complete an energizing circuit through the solenoid. As the plunger moves upwardly in response to solenoid energization, causing the diaphragm to draw a charge of fuel into the pump chamber 38, the plunger swings the actuating arm 10 upwardly through a dead center position of the spring 14 at which the actuated arm 11 is snapped downwardly to separate the switch contacts 12 and 15. The solenoid is thus deenergized, allowing the spring 7 to propel the plunger downwardly, causing the diaphragm to expel fuel from the pump chamber, under pressure, at the rate at which it is required by the engine, and again carrying the actuating arm 10 through the dead center position of the spring 14 to snap the actuated arm 11 back up and reengage the switch contacts 12 and 15 to repeat the pumping cycle.

Attention is directed to the fact that the pump just described delivers a uniform quantity of fuel to the engine with each stroke of the diaphragm, and that the frequency of its strokes is dependent upon the rate at which fuel is being consumed by the engine. The volume of fuel that the pump delivers at each stroke can be adjusted by any suitable means, as for example, by means of a set screw 16 in the top of the pump body which engages the actuated arm 11 at the top of its stroke, and which is adjustable up and down to define the point in the travel of the actuating arm 10 at which the overcenter spring reaches its dead center position and the switch contacts 12 and 15 are separated. The relatively fixed contact 15 of the switch is preferably resiliently mounted to provide for such adjusting variation of the uppermost switch closing position of the actuated arm 11.

According to the method of this invention an electrical output is produced each time the pump is charged with a quantity of fuel, which output is applied to a capacitor 23 to fully charge the same. The electrical output producing means may comprise either a switch actuated directly by the solenoid plunger or a relay 17, having its winding 44 connected in parallel with the solenoid 6 by means of a conductor 45 and a ground 46. When the relay winding is energized, concurrently with energization of the solenoid winding, a movable switch member 48 on the relay is moved into engagement with a fixed contact 47 to complete a circuit from the battery 40 by which the capacitor 23 is charged. The circuit which connects the battery, relay and capacitor 23 comprises a conductor 21 connected between relay contact 47 and one side of capacitor 23, and a conductor 22 connected between movable relay member 48 and the ungrounded terminal 51 of the battery. The capacitor 23 is of course grounded, as at 23', to complete the circuit through the grounded terminal 50 of the battery.

The relationship between fuel consumption and distance traveled by the vehicle is determined according to the method of this invention by partially discharging the capacitor 23 each time the vehicle traverses a predetermined unit of distance, continuously measuring the average charge across the capacitor, and presenting an indication of the value of that average charge in terms of fuel mileage.

The recurrent partial discharges of the capacitor 23 are effected by a single lobe cam 27 on the odometer shaft of the vehicle that actuates a double throw switch 25 whereby a discharging capacitor 26 is alternately connected across the capacitor 23 and short circuited. The odometer shaft rotates the cam 27 at a predetermined rate such that the cam completes one revolution each time the vehicle traverses a predetermined unit of distance. Through an axially movable tappet or rod 28 the cam 27 actuates the movable arm 29 of the double throw switch 25 to alternately engage it with either a fixed contact 30 or a fixed contact 31. The fixed contact 30 of the switch is connected, by means of a conductor 52, with the ungrounded side of the capacitor 23, while the movable switch contact 29 is connected, by means of a conductor 53, with one side of the discharging capacitor 26. The other side of the discharging capacitor 26 is grounded and is also connected with the fixed contact 31 of switch 25.

It will be apparent that each time the vehicle traverses the predetermined unit of distance corresponding to one rotation of cam 27, the lobe of the cam will swing the movable switch member 29, against its resilient bias, into engagement with the fixed switch contact 30, connecting the discharging capacitor 26 across the capacitor 23 and thus causing a portion of the charge on capacitor 23 to be discharged into the discharging capacitor 26. As the cam 27 continues its rotation, the movable switch member 29 swings away from contact 30 in response to its bias and into engagement with the fixed switch contact 31, short circuiting the discharging capacitor 26 to discharge it so that it will again be capable of effecting partial discharge of the capacitor 23 at the beginning of the next cycle of cam rotation when the switch contacts 29 and 30 are reengaged. The distance traversed by the vehicle for each cycle of cam rotation is so chosen with respect to normally expected fuel consumption that the cam will make several revolutions for each stroke of the fuel pump, or in other words, several partial discharges of the capacitor 23 will take place between successive chargings thereof.

Connected across the capacitor 23 is an integrating circuit of known type by which the average voltage obtaining across the capacitor 23 can at all times be measured and by which an indication of that average value can be continuously presented in terms of fuel mileage. The integrating circuit comprises an integrating capacitor 32, resistors 33 and 34, a rheostat 35, and a galvanometer 36. One side of the integrating capacitor 32 is grounded, as at 54, and its other side is connected, through the resistor 33 and conductors 55 and 56, with the ungrounded side of the capacitor 23. Through resistor 33 the integrating capacitor 32 is charged to a voltage which continuously reflects the average voltage existing across the capacitor 23; and at the same time the voltage across the integrating capacitor is measured by means of the galvanometer 36, which is connected across the integrating capacitor by a circuit that includes the resistor 34 and rheostat 35 connected in series with one another and with one side of the galvanometer, and a conductor 56 that provides a series connection between the ungrounded side of the integrating capacitor and the resistor 34. The other side of the galvanometer is of course grounded as at 57. Since the deflection of the galvanometer 36 is proportional to the average voltage across the capacitor 23, the galvanometer can be graduated in miles per gallon or in some other unit showing relationship between fuel consumed and distance traveled by the vehicle.

FIGURES 2 and 3 graphically represent the variation of the charge across the capacitor 23 as a function of the distance S traveled by the vehicle. For the sake of simplicity, each of the graphs begins at the instant when the capacitor 23 is fully charged, and at which the voltage across it thus has the value $U_0$.

If N is assumed to denote the number of revolutions through which the cam 27 is rotated when the vehicle traverses a distance equal to 1 mile, the value $1/N$ indicates the length in miles of the unit of distance which has been covered when the first partial discharge of the capacitor 23 occurs. At that point the voltage across said capacitor will be decreased to the value $U_1$, which is determined by the equation $$U_1 = U_0 \frac{1}{1+\frac{C_1}{C_0}}$$

in which $C_0$ is the capacitance of the capacitor 23 and $C_1$ is the capacitance of the discharging capacitor 26.

After the vehicle traverses a second unit of distance, equal to the first, another partial discharge of the capacitor 23 takes place, and the voltage across it is correspondingly decreased to the value $U_2$.

Letting the constant $$\frac{1}{1+\frac{C_1}{C_0}} = \alpha$$

the following relation is obtained:

$$U_2 = \alpha^2 \cdot U_0$$

In the same way the voltage $U_n$ is attained after a number $n$ of partial discharges of capacitor 23, according to:

$$U_n = \alpha^n \cdot U_0$$

on the assumption that the capacitor 23 is not recharged.

When the fuel quantity corresponding to one charge has been consumed, the capacitor 23 will be recharged through the operation of relay 17. The chargings of capacitor 23 occur independently of the distance covered and thus occur at unpredictable moments during the course of discharge, e.g. between two partial discharges, as shown in the diagram.

In the example according to FIGURE 2 the fuel consumption is such that the charge on the capacitor 23 is reestablished after a relatively small number of partial discharges, which means that the fuel consumption is large in relation to the distance covered. FIGURE 3 illustrates how the charge on capacitor 23 varies when the vehicle is driven in such a manner that the fuel is more efficiently utilized, or in other words, when a greater number of units of distance are traversed for each unit quantity of fuel consumed.

If F denotes the fuel consumption in gallons per mile, and $U_m$ the average voltage across the capacitor 23, the relative deflection $$\frac{U_m}{U_0}$$

of the galvanometer instrument can be calculated under the assumption of ideal integration according to the formula:

$$\frac{U_m}{U_0} = \frac{(1+\alpha) \cdot 3000F}{2N} \cdot \frac{1 - \alpha^{\frac{N}{3000F}}}{1-\alpha}$$

The instrument 36 should have such sensitivity in relation to the rapidity with which fuel consumption of the vehicle varies in practice that it reacts to a change of $U_m$ between two consecutive charging instants, but on the other hand its sensitivity must not be so great that it is actuated by the instantaneous voltage across the capacitor 23. The instrument can be provided with an inertia which meets these conditions by a suitable choice of resistance and capacitance values in the integrating circuit. Calibration of the scale of the instrument, which is best made at full deflection of the indicator and when the vehicle is stationary, is effected by changing the setting of the rheostat 35.

Under some circumstances it may be advantageous to let a single charge on capacitor 23 represent two or more small fuel quantity units discharged consecutively, particularly in the case where fuel consumption of the vehicle per distance unit is high in relation to the quantity which is discharged during each pump stroke. Obviously the apparatus must then be supplemented by a computer which is responsive to the pump strokes and which delivers an impulse to the relay 17 or other contact device only after the pump has carried out the predetermined number of strokes.

Instead of responding to strokes of the fuel pump, the means for charging the capacitor 23 could be made responsive to the stream flow of fuel to the engine, to provide a capacitor charging impulse each time a predetermined unit quantity of fuel has been delivered. Obviously the cam 27 could be actuated by a clockwork mechanism in cases where a continuing indication of fuel consumption per unit time was of particular interest, as in aircraft, marine vessels and stationary installations.

From the foregoing description taken together with the accompanying drawings it will be apparent that this invention provides a simple, dependable and inexpensive method and means for obtaining a continuous and direct measurement and indication of fuel mileage, and that the invention also provides a reliable fuel mileage meter for automobiles, motor trucks and the like adapted to operate in conjunction with a positive displacement fuel pump.

What is claimed as my invention is:

1. The method of providing continuous indications of fuel consumption in relation to distance traversed by a vehicle, which method comprises: recurrently delivering a uniform quantity of fuel from a source thereof to a point of consumption at a rate proportional to fuel requirements; electrically charging a capacitor to a predetermined charge value each time such a quantity of fuel is delivered to the point of consumption; partially discharging the capacitor each time the vehicle traverses a predetermined unit of distance; and continuously measuring and indicating the average value of the charge remaining on the capacitor to thus provide an indication corresponding to the quantity of fuel consumed in relation to distance traveled.

2. The method of claim 1, further characterized by the fact that said predetermined unit of distance at which each partial discharge of the capacitor takes place, and the amount of discharge which occurs, are so related to the amount of fuel comprising each of said uniform quantities thereof that a plurality of discharges of the capacitor normally occurs between successive chargings thereof.

3. A fuel mileage meter for a vehicle, comprising: means for recurrently delivering a uniform quantity of fuel from a source thereof to a point of consumption at a rate proportional to fuel requirements, said means including a part that is moved each time a quantity of fuel is delivered to the point of consumption; a first switch means operated by said part, to be closed each time a quantity of fuel is delivered to the point of consumption; a capacitor; means providing a source of direct current at a uniform predetermined voltage; means defining a circuit that includes said source of direct current, the first switch means and the capacitor, and whereby the capacitor is charged to a predetermined voltage each time said first switch means is closed; means on the vehicle for effecting a motion which recurs each time the vehicle traverses a predetermined unit of distance; a second switch operatively associated with said last named means to be momentarily closed thereby each time the vehicle traverses said unit of distance; discharge circuit means connected with the second switch and with the capacitor for discharging a predetermined fraction of the charge on the capacitor each time the second switch is closed; and means including a galvanometer, and integrating circuit means connected with the capacitor and the galvanometer, for continuously indicating the average voltage remaining across the capacitor and presenting the same in terms of a relationship between fuel consumption and distance traveled.

4. A fuel mileage meter for a vehicle, comprising: a capacitor; means providing a source of direct current at a uniform predetermined voltage; means defining a normally open electric circuit that includes the capacitor and the source of current; means responsive to rate of flow of fuel from a source thereof to a point of consumption to momentarily close the electric circuit and thus charge the capacitor to a predetermined voltage each time a predetermined uniform quantity of fuel flows from said source to said point; means for partially discharging the capacitor each time the vehicle traverses a predetermined unit of distance; means including resistance and capacitance means connected with said capacitor providing an integrating circuit for producing a voltage which reflects the average voltage across said capacitor; and indicating means connected in said integrating circuit responsive to the voltage produced therein and by which the value of such voltage is presented in terms of a relationship between fuel consumed and distance traversed by the vehicle.

5. The fuel mileage meter of claim 4, further characterized by the fact that said means for partially discharging the capacitor comprises: a second capacitor; electrical circuit means including a double throw switch movable to a position in which said second capacitor is connected across the first designated capacitor and to an alternate position in which said second capacitor is short circuited to discharge itself; and means on the vehicle for moving said double throw switch from one of its positions to the other each time the vehicle traverses said predetermined unit of distance.

6. A fuel mileage meter for a vehicle, comprising: a positive displacement fuel pump of the type comprising a variable volume pump chamber with a movable wall member, into which chamber a predetermined quantity of fuel is drawn when the movable wall member is moved in one direction and from which such fuel is expelled under pressure when the movable wall member is moved in the other direction, a solenoid by which the movable wall member is moved in one direction, and means yieldingly biasing the movable wall member in the opposite direction; switch means responsive to the volume of fuel in the pump chamber to be momentarily closed each time fuel is drawn into the pump chamber; a capacitor; electric circuit means connecting the capacitor with said switch means and with a source of direct current of uniform predetermined voltage to charge the capacitor to a predetermined voltage each time the switch means is closed; a second capacitor; other electric circuit means for discharging the first designated capacitor into the second capacitor, including a double throw switch having a first closed position in which the second capacitor is connected across the first designated capacitor and a second closed position in which the second capacitor is short circuited; means on the vehicle for momentarily actuating the double throw switch from its second closed position to its first closed position each time the vehicle traverses a predetermined unit of distance; and integrating circuit means including a galvanometer, for continuously measuring and indicating the average voltage across the first designated capacitor and for presenting such measurement as a function of the relationship between fuel consumption and distance traveled.

7. The apparatus of claim 6, wherein said last named means comprises capacitance and resistance means.

References Cited in the file of this patent

UNITED STATES PATENTS

| | | |
|---|---|---|
| 1,665,857 | Needham | Apr. 10, 1928 |
| 2,179,925 | Dilg | Nov. 14, 1939 |
| 2,250,125 | Chisholm | July 22, 1941 |
| 2,330,159 | Thompson | Sept. 21, 1943 |
| 2,941,397 | Lee | June 21, 1960 |